United States Patent [19]
Jones et al.

[11] Patent Number: 5,431,464
[45] Date of Patent: Jul. 11, 1995

[54] COLLAPSIBLE FASCIA SUPPORT FOR AN AUTOMOTIVE BUMPER

[75] Inventors: Bradley A. Jones; Curtis H. Harris, both of Anderson, Ind.; Richard M. Zemmer, Metamora, Mich.

[73] Assignee: General Motors Corporation, Detroit, Mich.

[21] Appl. No.: 164,289

[22] Filed: Dec. 7, 1993

[51] Int. Cl.⁶ .............................................. B60r 19/24
[52] U.S. Cl. ................................. 293/121; 293/155
[58] Field of Search ..................... 293/120, 121, 155

[56] References Cited
U.S. PATENT DOCUMENTS

| | | | |
|---|---|---|---|
| 4,460,206 | 7/1984 | Peter | 293/120 X |
| 4,492,398 | 1/1985 | Peter | 293/120 |
| 4,877,279 | 10/1989 | Logan | 293/120 X |
| 4,925,224 | 5/1990 | Smiszek | 293/120 |
| 5,108,138 | 4/1992 | Kawaguchi | 293/120 |
| 5,129,197 | 6/1993 | Rich et al. | 293/120 |
| 5,290,078 | 3/1994 | Bayer et al. | 293/120 |

FOREIGN PATENT DOCUMENTS

| | | | |
|---|---|---|---|
| 118548 | 7/1984 | Japan | 293/121 |
| 2098553 | 11/1982 | United Kingdom | 293/121 |

*Primary Examiner*—David M. Mitchell
*Assistant Examiner*—Gary C. Hoge
*Attorney, Agent, or Firm*—Anthony Luke Simon

[57] ABSTRACT

An automotive bumper system includes an impact bar, a fascia, and a collapsible support mounted between the impact bar and the fascia. The collapsible support includes a plurality of brace sections and a strut section between adjacent pairs of brace sections. During a collision, the strut sections flex inwardly, thereby pulling the fascia downwardly away from damageable components.

7 Claims, 2 Drawing Sheets

COLLAPSIBLE FASCIA SUPPORT FOR AN AUTOMOTIVE BUMPER

BACKGROUND OF THE INVENTION

1. FIELD OF THE INVENTION.

The present invention relates generally to automotive bumpers, and in particular is concerned with a collapsible support mounted between an impact bar and a fascia.

2. DESCRIPTION OF THE RELATED ART.

Soft bumper systems for both front and rear ends of automobiles are well-known. Generally, an impact bar (also known as an impact beam) is mounted on a frame or support structure with fasteners or other suitable means. Impact bars are designed to resist deformation during impact, and reduce damage to the body and other components. Oftentimes, an energy-absorbing material is mounted on the outer face of an impact bar to absorb energy imparted by a collision. A pliable fascia is fitted over the energy-absorbing medium to provide an attractive outer surface of the bumper system.

Typically, a rigid support is provided between the fascia and the impact bar to hold the fascia in place. The support can be mounted on an upper surface of the impact bar and is fastened to the fascia. During impact, the support strokes with the impact bar and may buckle upwardly above the fascia, causing damageable components above the fascia to bend out of location or break.

SUMMARY OF THE INVENTION

The present invention includes a collapsible support mounted between an impact bar and a fascia. The collapsible support is mounted on an impact bar and is fastened to an upper portion of the fascia. During a collision, the collapsible support flexes inwardly, thereby pulling the fascia down away from damageable parts above the fascia. When the impact force is removed, the support tends to return to its original position. The collapsible support is economical to manufacture and easy to install in conventional bumper systems.

In a preferred embodiment, an automotive bumper system includes an impact bar, a fascia, and a collapsible support mounted between the impact bar and the fascia. The collapsible support includes a plurality of brace sections and a strut section between adjacent pairs of brace sections. During a collision, the strut sections flex inwardly, thereby pulling the fascia downwardly away from damageable components.

DETAILED DESCRIPTION OF THE PREFERRED EMBODIMENT

Figure 1:
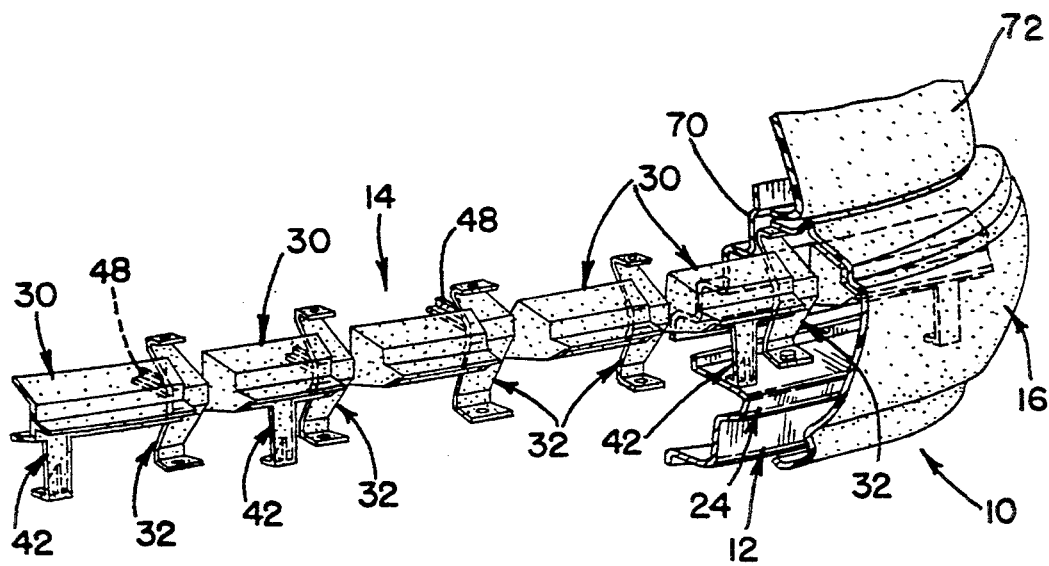
FIG. 1 is a perspective view of an automotive bumper system illustrating a collapsible support according to the present invention mounted between an impact bar and a fascia.

An automotive bumper system is indicated generally at 10 in FIG. 1. The system 10 includes an impact bar 12, a collapsible support 14, and a fascia 16. An energy absorber (not illustrated) can be fitted between the impact bar 12 and the fascia 16 if desired. The bumper system 10 can be adapted for either the front or rear of a vehicle.

Figure 3:
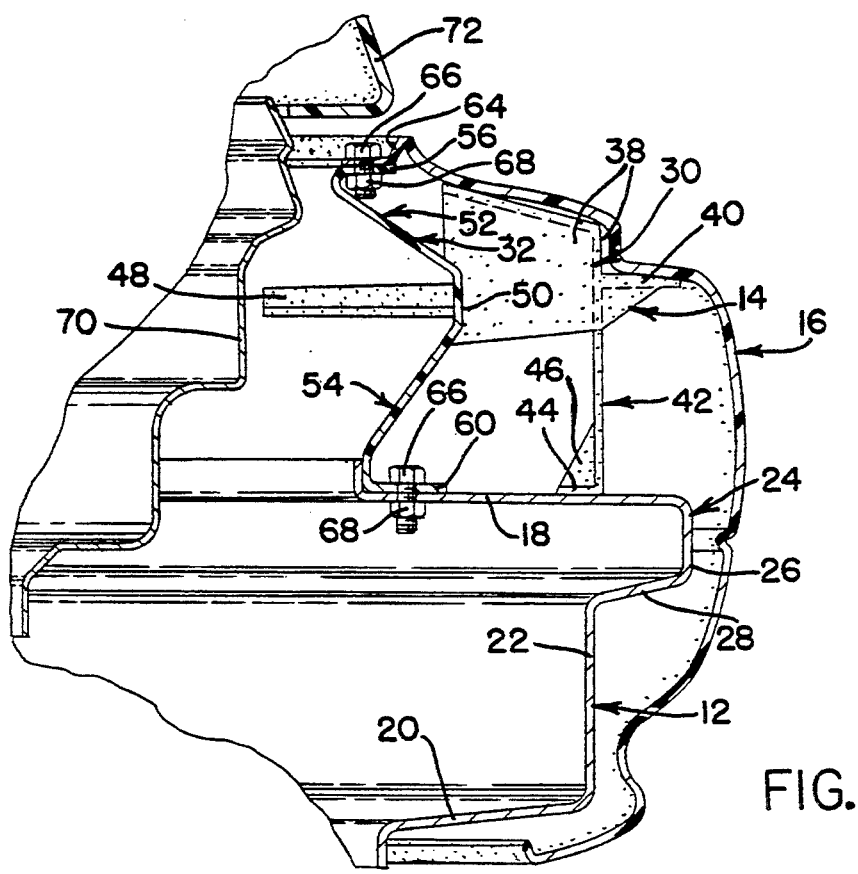
FIG. 3 is a sectional view of the assembled bumper system of FIG. 1 prior to a collision.
Figure 4:
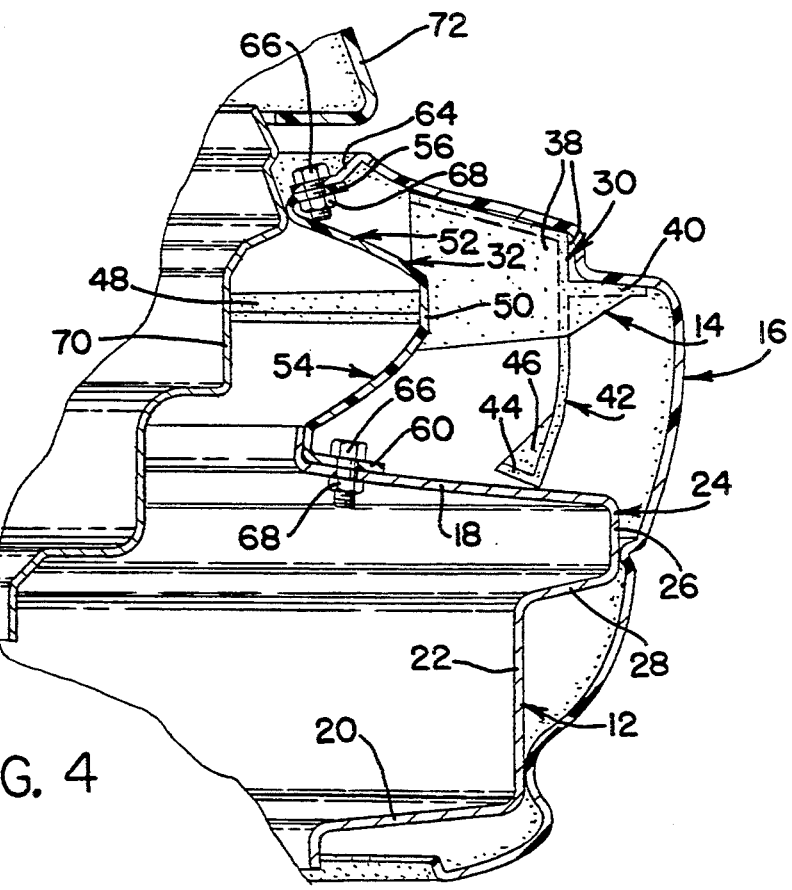
FIG. 4 is a view similar to FIG. 3 during a collision illustrating a top portion of the fascia drawn downwardly by the collapsible support.

The impact bar 12 has an open cross section formed by a generally horizontal upper wall 18 and a generally horizontal lower wall 20 connected by a generally vertical, side wall 22, illustrated best in FIGS. 3 and 4. If desired, an outwardly projecting offset 24 can be formed in the side wall 22 by walls 26 and 28. The impact bar 12 is formed from a high strength material capable of resisting deformation during impacts. In other embodiments, the impact bar 12 can be a tubular, roll-formed beam having a closed cross section. The impact bar 12 is attached to a vehicle by any suitable manner, including fasteners received by brackets fitted on a vehicular frame, none of which are illustrated in the figures.

Figure 2:
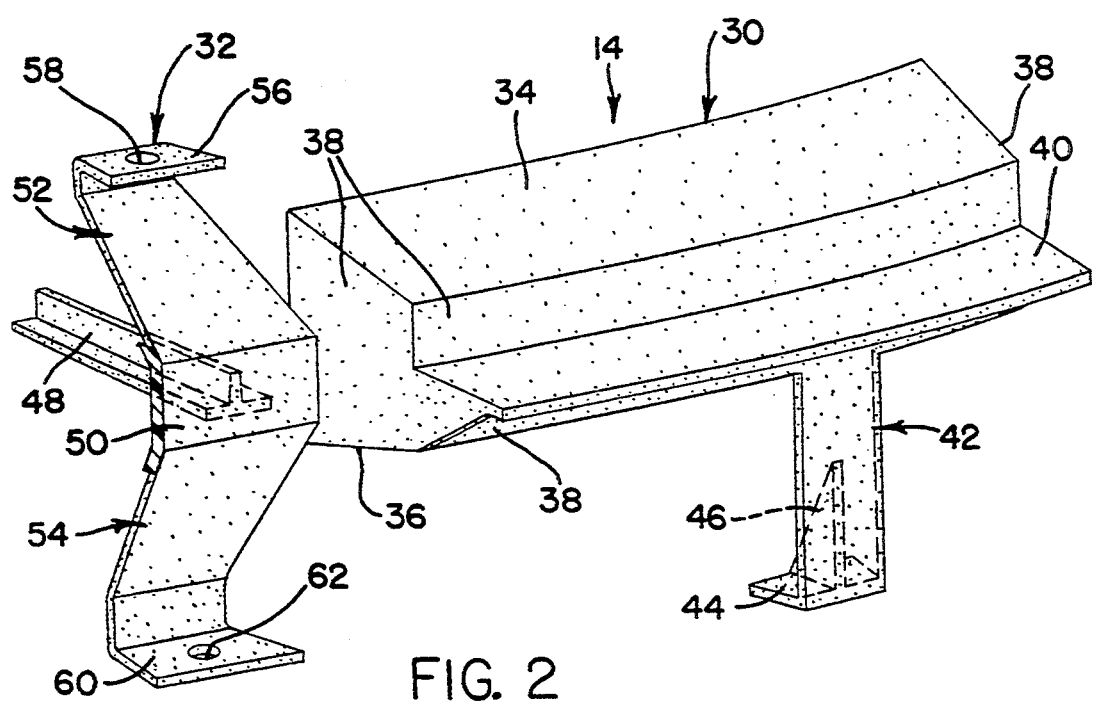
FIG. 2 is an enlarged perspective view of a portion of the collapsible support removed from the bumper system of FIG. 1 illustrating a brace section and a strut section.

The collapsible support 14 substantially spans the length of the impact bar 12 and is formed as a plurality of brace sections 30 connected by strut sections 32. As illustrated best in FIG. 2, each brace section 30 includes an upper wall 34, a lower wall 36, side walls 38, an outwardly projecting ledge 40, and, as required, a leg 42. When mounted in the bumper system 10, the upper wall 34 and ledge 40 support adjacent portions of the fascia 16, as illustrated in FIGS. 1, 3 and 4. Each leg 42 preferably terminates in a base 44 which rests on the upper wall 18 of the impact bar 12. A rib 46 can be provided between the leg 42 and base 44 for added strength.

Each strut section 32 includes a beam 48 (shown with a "T" cross section in the figures) terminating at an end wall 50. Upper and lower flexible wings 52 and 54 are formed on opposite sides of the end wall 50. The upper wing 52 terminates in a base 56 having an opening 58. The lower wing 54 terminates in a base 60 having an opening 62. When mounted in the bumper system 10, the base 56 of the upper wing 52 is secured to an upper lip 64 of the fascia 16 by fasteners such as bolts 66 and nuts 68. The base 60 of the lower wing 54 is mounted on the upper wall 18 of the impact beam 12 by suitable fasteners.

Preferably, the brace sections 30 and strut sections 32 are integrally formed as a single molded element from a flexible plastic material. The end wall 50 of a strut section 32 can be adjoined to side walls 38 of adjacent brace sections 30. The profiles of the sections 30, 32 can be modified for a specific bumper application.

The collapsible support 14 provides support for the fascia 16 at its upper portions. Such support prevents the fascia 16 from sagging and creating undesirable gaps between bumper components.

During a collision, the collapsible support 14 pulls the upper lip 64 of the fascia 16 downwardly away from components of an automobile above the bumper system 10, thereby preventing damage to such components. As illustrated in FIG. 3, a predetermined distance is provided between the beam 48 and a rigid component of the vehicle, such as a body member 70. During a collision, the fascia 16 begins to stroke toward the body member 70. The collapsible support 14 travels with the impact bar 12 until the strut section 32 engages the rigid body member 70. When contact is made between the beam 48 and the body member 70, the wings 52, 54 flex inwardly toward the beam 48. The upper wing 52 pulls the fascia lip 16 down away from a damageable component 72 (such as a rear deck lid) to prevent the component 72 from being bent out of position or broken. After the collision force has been removed in a relatively minor collision, the collapsible support 14 tends to return to its original position.

Although the present invention has been described with reference to a preferred embodiment, a person skilled in the art will recognize that changes may be made in form and detail without departing from the spirit and scope of the invention.

The embodiments of the invention in which an exclusive property or privilege is claimed are defined as follows:

1. A collapsible fascia support for an automotive bumper system comprising:
   (a) a plurality of brace sections; and
   (b) a plurality of strut sections provided between adjacent pairs of brace sections, wherein each strut section includes first and second flexible wings and a beam.

2. The collapsible fascia support specified in claim 1 wherein the brace sections and strut section are formed as an integral member.

3. The collapsible fascia support specified in claim 2 wherein the integral member is molded from a plastic material.

4. The collapsible fascia support specified in claim 1 wherein each brace section includes an outwardly projecting ledge.

5. The collapsible fascia support specified in claim 1 wherein selected brace sections include a leg.

6. In automotive bumper system comprising:
   (a) an impact bar;
   (b) a fascia; and
   (c) a collapsible support, mounted between the impact bar and the fascia, having a plurality of brace sections and a strut section between adjacent pairs of brace sections, each of the strut sections including a first flexible wing mounted to the fascia and a second flexible wing mounted on the impact bar.

7. The automotive bumper system specified in claim 6 wherein each strut section includes a beam.

* * * * *